(12) United States Patent
Avalani et al.

(10) Patent No.: US 12,013,856 B2
(45) Date of Patent: Jun. 18, 2024

(54) BURST PERFORMANCE OF DATABASE QUERIES ACCORDING TO QUERY SIZE

(71) Applicant: Amazon Technologies, Inc., Seattle, WA (US)

(72) Inventors: Bhaven Avalani, Cupertino, CA (US); Andrew Edward Caldwell, Santa Clara, CA (US); Naresh Chainani, Mountain View, CA (US); Martin Grund, Lafayette, CA (US); Anurag Windlass Gupta, Atherton, CA (US); Frederick Ryan Johnson, Orem, UT (US); Ippokratis Pandis, Menlo Park, CA (US); Michail Petropoulos, San Francisco, CA (US); Srividhya Srinivasan, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 245 days.

(21) Appl. No.: 16/102,545

(22) Filed: Aug. 13, 2018

(65) Prior Publication Data
US 2020/0050694 A1 Feb. 13, 2020

(51) Int. Cl.
*G06F 16/24* (2019.01)
*G06F 16/2453* (2019.01)
*G06F 16/2455* (2019.01)
*G06F 16/28* (2019.01)

(52) U.S. Cl.
CPC ...... *G06F 16/2455* (2019.01); *G06F 16/2453* (2019.01); *G06F 16/283* (2019.01); *G06F 16/285* (2019.01)

(58) Field of Classification Search
CPC ............... G06F 16/2455; G06F 16/285; G06F 16/2453; G06F 16/283; G06F 16/25; G06F 16/24553
See application file for complete search history.

(56) References Cited

U.S. PATENT DOCUMENTS

| | | | |
|---|---|---|---|
| 5,778,224 A * | 7/1998 | Tobe | G06F 9/466 718/100 |
| 5,905,898 A | 5/1999 | Qureshi | |
| 6,502,062 B1 | 12/2002 | Acharya | |
| 6,769,017 B1 | 7/2004 | Bhat et al. | |
| 7,058,622 B1 | 6/2006 | Tedesco | |
| 7,290,015 B1 | 10/2007 | Singhal | |
| 9,032,017 B1 | 5/2015 | Singh et al. | |

(Continued)

OTHER PUBLICATIONS

U.S. Appl. No. 16/007,697, filed Jun. 13, 2018, Gaurav Saxena et al.

(Continued)

*Primary Examiner* — Pierre M Vital
*Assistant Examiner* — Andrew N Ho
(74) *Attorney, Agent, or Firm* — S. Scott Foster; Kowert, Hood, Munyon, Rankin & Goetzel, P.C.

(57) ABSTRACT

Burst performance of a database query may be determined according to a size of the database query. A query to a database may be received. A size may be determined for the query. If the size is less than a size threshold assigned to a first query engine, then the query may be performed at the first query engine. If the size is greater than or equal to the size threshold assigned to the first query engine, then the query may be performed at a second query engine.

20 Claims, 12 Drawing Sheets

(56) References Cited

U.S. PATENT DOCUMENTS

| | | |
|---|---|---|
| 9,137,287 B2 | 9/2015 | Alecci |
| 9,477,710 B2 | 10/2016 | Narasayya et al. |
| 9,703,602 B1* | 7/2017 | Kusters .................. G06F 3/061 |
| 10,423,644 B1* | 9/2019 | Leach ............... G06F 16/24542 |
| 10,891,290 B2* | 1/2021 | Morris ............. G06F 16/24542 |
| 2003/0126114 A1* | 7/2003 | Tedesco .............. G06F 16/2455 |
| 2005/0021511 A1* | 1/2005 | Zarom ................ G06F 16/2471 |
| 2006/0167883 A1* | 7/2006 | Boukobza ........... H04L 67/1008 |
| 2006/0294058 A1* | 12/2006 | Zabback ............. G06F 16/2462 |
| 2007/0185913 A1* | 8/2007 | Reichert ............. G06F 11/3447 |
| 2008/0270346 A1 | 10/2008 | Mehta et al. |
| 2008/0281784 A1* | 11/2008 | Zane .................. G06F 16/2471 |
| 2009/0254774 A1 | 10/2009 | Chamdani et al. |
| 2010/0082603 A1 | 4/2010 | Krompass et al. |
| 2010/0198777 A1* | 8/2010 | Lo ........................ G06F 16/283 707/601 |
| 2011/0153662 A1 | 6/2011 | Stanfill et al. |
| 2011/0179014 A1* | 7/2011 | Schechter ............ G06F 16/258 707/718 |
| 2011/0179017 A1* | 7/2011 | Meyers ............ G06F 16/24534 707/722 |
| 2011/0270822 A1* | 11/2011 | Denton ............... G06F 16/2453 707/E17.061 |
| 2012/0323929 A1* | 12/2012 | Kimura ................ G06F 16/273 707/748 |
| 2013/0191360 A1* | 7/2013 | Burkard ................. G06F 40/14 707/706 |
| 2013/0226903 A1 | 8/2013 | Wu et al. |
| 2013/0262678 A1 | 10/2013 | Tung |
| 2014/0019415 A1 | 1/2014 | Barker et al. |
| 2014/0164818 A1 | 6/2014 | Jones |
| 2014/0214880 A1 | 7/2014 | Chi et al. |
| 2014/0280373 A1* | 9/2014 | Raitto ............... G06F 16/24542 707/803 |
| 2016/0162546 A1* | 6/2016 | Oh .................... G06F 16/24542 707/718 |
| 2016/0188696 A1 | 6/2016 | Belghiti |
| 2016/0203404 A1 | 7/2016 | Cherkasova et al. |
| 2017/0316078 A1* | 11/2017 | Funke .................. G06F 16/283 |
| 2018/0046643 A1* | 2/2018 | Brodt ................. G06F 16/2457 |
| 2018/0060132 A1 | 3/2018 | Maru et al. |
| 2018/0060394 A1 | 3/2018 | Gawande |
| 2018/0060395 A1* | 3/2018 | Pathak .................. G06F 9/5088 |
| 2018/0268079 A1* | 9/2018 | Das .................. G06F 16/90335 |
| 2019/0026335 A1* | 1/2019 | Gerweck ........... G06F 16/24578 |
| 2019/0149605 A1 | 5/2019 | Yang |
| 2019/0197173 A1 | 6/2019 | Tahara |
| 2020/0042636 A1* | 2/2020 | Routray .............. H04L 63/1425 |

OTHER PUBLICATIONS

International Search Report and Written Opinion from PCT/US2019/044381, dated Sep. 25, 2019, pp. 1-11.

U.S. Appl. No. 16/364,055, filed Mar. 25, 2019, Mingda Li.

U.S. Appl. No. 16/452,385, filed Jun. 25, 2019, Gaurav Saxena.

U.S. Appl. No. 16/435,402, filed June 7,2 019, Stavros Harizopoulos.

\* cited by examiner

BURST PERFORMANCE OF DATABASE QUERIES ACCORDING TO QUERY SIZE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Some types of data access requests require intensive computational and storage access workloads, while other types of data access requests may only involve small amounts of work to process. As data stores may have to process both high and low workload access requests, techniques to perform the different types of access requests may be implemented so that access request processing is optimally performed.

Figure 1:
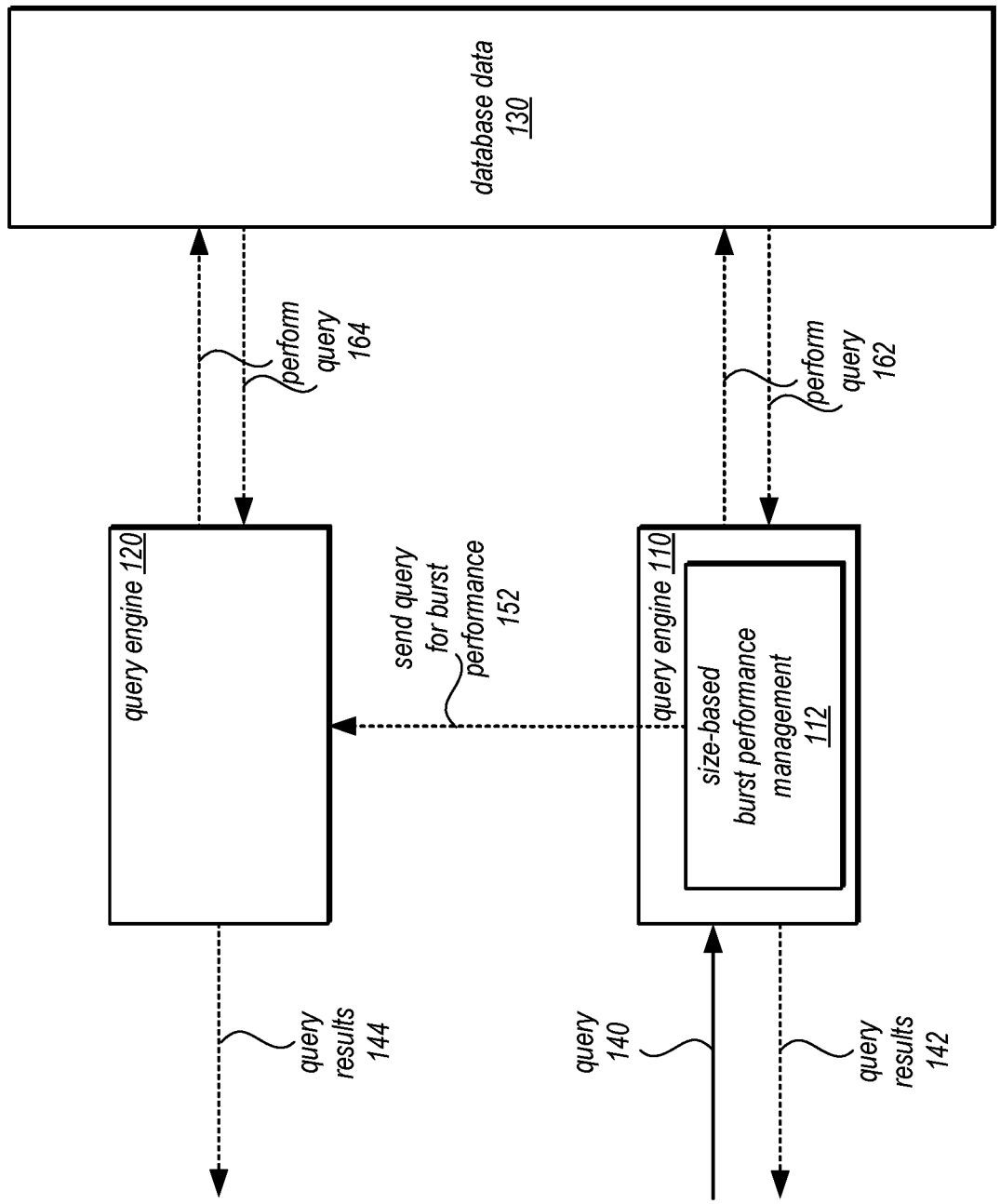
FIG. 1 illustrates a logical block diagram of burst performance of database queries according to query size, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of burst performance of database queries according to query size, according to some embodiments are described herein. Queries for data that satisfies various conditions or criteria, insertions, deletions, modifications, or any other request triggering processing based on a request to access a data store may utilize various processing resources, including various central processing units (CPUs), graphical processing units (GPUs), or other processing components that may execute various tasks to process database queries, in some embodiments. Because database queries may vary in terms of the workload placed upon the processing resources to execute the database query, in some embodiments, the amount of processing resources that any one query engine may provide could be inadequate (or underutilized) to meet the demands of some query workloads, in various embodiments.

For example, a query engine could be optimally sized to perform short, quick or other small-sized queries that are performed with a client system expectation that a result of the query will be returned quickly. Long-running, slow, or other large-sized queries may not perform as efficiently at the same query engine (e.g., as it may not be distributed amongst a large number of nodes in a distributed query processing platform like the clusters described below with regard to FIGS. 2-8. Therefore, additional or other burst capacity provided by an additional query engine (or multiple query engines) may be used to handle increases in workload from database queries or other queries that could be more optimally performed using a different query engine, in some embodiments.

Burst capacity may incur startup costs or costs to maintain the burst capacity for performing database queries, in some embodiments. Burst performance of database queries according to query size may optimally select which queries to perform using burst query processing resources, such as a secondary query engine, in various embodiments, in order to reduce the impact of startup or maintenance costs for bust capacity. For example, some queries may be performed more optimally at the current, original, or primary query engine even if the query would have to be queued or otherwise wait to be performed. Consider a small query, which may not take a large amount of time to perform. If the short query were received at a query engine that is "full" or otherwise would have to wait to perform the query, the startup costs to ready an additional query engine to perform the small query would outweigh the benefits of performing the short query on the burst query (e.g., as the short query could potentially wait longer to be performed and/or the cost incurred by the client application to use the additional query engine be greater than the benefits of using the additional query engine to perform the short query). Alternatively, if the query were large, the startup costs to ready the additional query engine to perform the large query may not be relatively as large with respect to the large query, and thus utilization of the additional query engine may provide a result to the long query faster than waiting (and/or being interrupted) at the primary query engine. In various embodiments, burst performance of database queries according to query size may be implemented to automatically and intelligently choose when to utilize burst resources to perform a query so that the costs of utilizing the burst resources are not outweighed by its benefits (e.g., providing faster performance for queries to the database overall without increasing resource costs or wasting additional resources), improving the performance of database queries and utilization of resources to perform database queries for a database system overall.

FIG. 1 illustrates a logical block diagram of burst performance of database queries according to query size, according to some embodiments. Query engine 110 may be a query processing platform, application or system of one or multiple components (e.g., a processing cluster as discussed below that includes one or multiple processing nodes or a single node query engine) that can perform queries, such as query 140 to a database, by accessing database data 130, in some embodiments. Database data 130 may be stored or co-located with query engine 110 in some embodiments (e.g., in attached storage as described below in FIG. 5) or may be a separate data store (e.g., network attached storage and/or a separate storage service), in some embodiments. Database data 130 may be stored for various types of databases to which queries may be performed (e.g., relational, non-relational, NoSQL, document, graph, etc.), in some embodiments. FIGS. 3-8, for instance, discuss a data warehouse style database that stores database data, as well as other data stores, such as object-based storage service 330 (which may be general data stores which store data other types or formats of data in addition to database data.)

In some embodiments, an additional query engine, such as query engine 120, or multiple additional query engines (not illustrated), may be implemented to perform some queries. Like query engine 110, query engine 120 may be a query processing platform, application or system of one or multiple components (e.g., a processing cluster as discussed below that includes one or multiple processing nodes or a single node query engine) that can perform queries, such as query 140 to a database, by accessing database data 130, in some embodiments. Query engine 120 may be different than query engine 110, in some embodiments (e.g., a different number of nodes, different hardware resources, and/or different engine applications or other query performance components). In some embodiments, query engine 120 may be substantially similar (or the same) as query engine 110.

Query engine 110 may implement size-based burst performance management 112 in order to select whether a database query is performed at query engine 110 or another query engine, such as query engine 120. Size-based burst performance management 112 may determine a size (e.g., an estimated or actual size) of a received query 140 according to various techniques (e.g., rules-based or machine learning based classifications, historical data, query features, etc.) to determine a size for query 140. A threshold size of queries for performing query 140 at query engine 110 may be evaluated with respect to the determined size, in some embodiments. If, as discussed below with regard to FIG. 9, the size is less than the threshold, then query 140 may be performed 162 by query engine 110, which may return query results 142. If the size is greater than or equal to the threshold, then size-based burst performance management 112 may send the query 152 for burst performance at query engine 120, which may perform the query 164 and return a query result 144. In this way, the expected performance of query as indicated by its size may be used to send the query for burst performance in those scenarios that efficiently utilize query engine 120. Dynamically provisioning burst resources, such as discussed below with regard to FIG. 8, may utilize sized-based selection for burst performance in order to ensure that additional resources are not provisioned unless the costs of provisioning the resource are less than the costs of allowing the query to wait at the original query engine, in some embodiments, reducing resource waste by preventing additional resources from being provisioned without performance benefit to the database system and client application. Further considerations may be applied, as discussed below with regard to FIGS. 7 and 10, in which a query with a size greater than the threshold may still be performed at the receiving query engine 110, in some embodiments.

Please note that the previous description of a query engine, size-based burst performance management, database data, and performance of queries is a logical description and thus is not to be construed as limiting as to the implementation of a query engine, size-based burst performance, database data, and performance of queries, or portions thereof. For example, query engine 120 could return query results 144 to query engine 110, which may then responds to query 140, similar to the interactions discussed below with regard to FIGS. 5 and 6.

This specification begins with a general description of a provider network that implements multiple different services, including data processing services and storage services, which may perform burst performance of database queries according to query size. Then various examples of multiple data processors, such as a data warehouse service and a format independent data processing service, including different components/modules, or arrangements of components/module that may be employed as part of implementing the data processors are discussed. A number of different methods and techniques to implement c burst performance of database queries according to query size are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
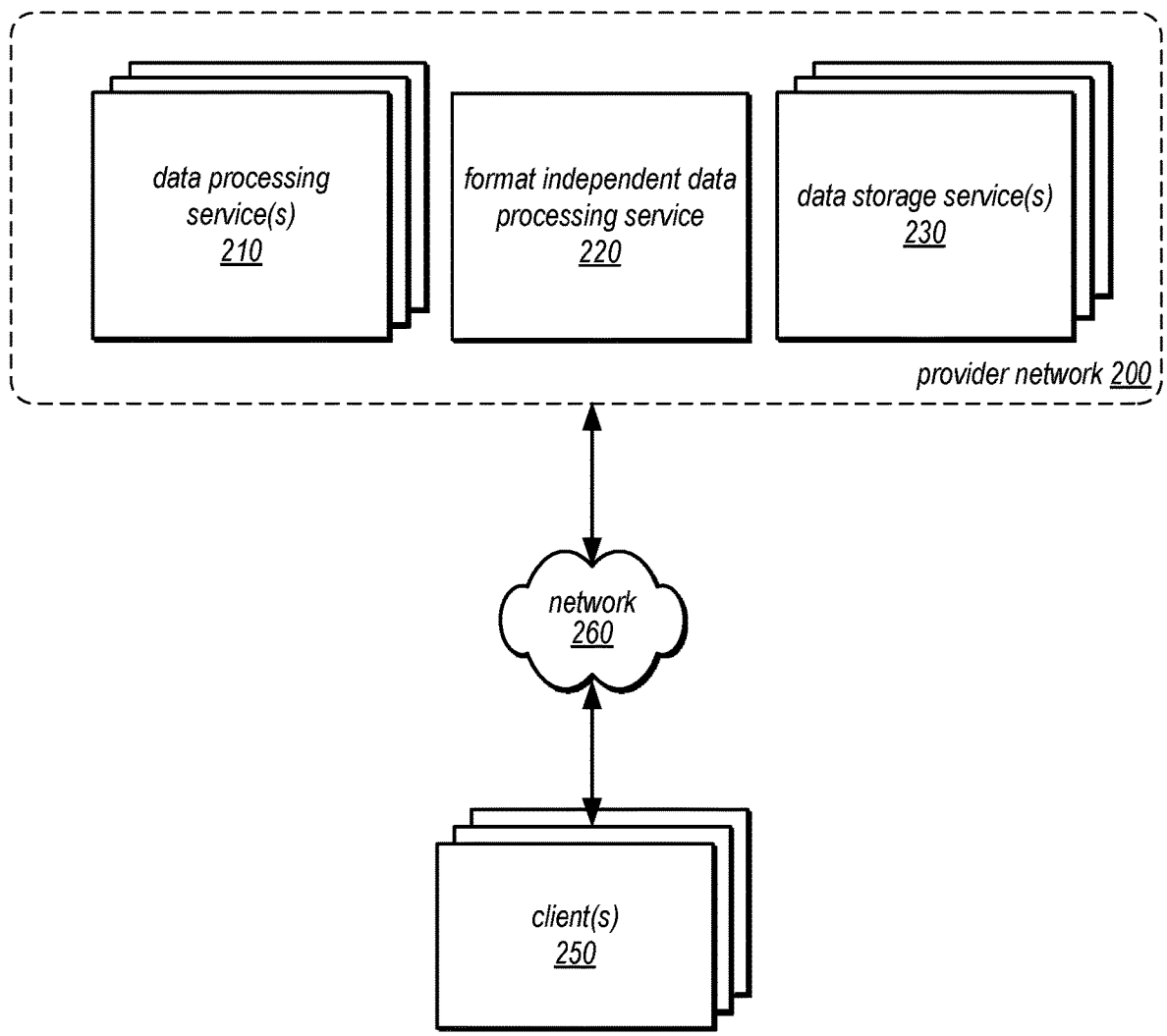
FIG. 2 is a logical block diagram illustrating a provider network offering data processing services that implement burst performance of database queries according to query size, according to some embodiments.

FIG. 2 is a logical block diagram illustrating a provider network offering data processing services that implement burst performance of database queries according to query size, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and storage services offered by the provider network 200. In some embodiments, provider network 200 may implement various computing resources or services, such as data processing service(s) 210, (e.g., a map reduce service, a data warehouse service, and/or other large scale data processing services or database services), format independent data processing service 220, and data storage services 230 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given system or service component (e.g., a component of data processing service 210, format independent data processing service 220, or data storage service 230) may be implemented by a particular node or may be distributed across several nodes. In some embodiments, a given node may implement the functionality of more than one service system component (e.g., more than one data store component).

Data processing services 210 may be various types of data processing services that perform general or specialized data processing functions (e.g., anomaly detection, machine learning, data mining, big data querying, or any other type of data processing operation). For example, in at least some embodiments, data processing services 210 may include a map reduce service that creates clusters of processing nodes that implement map reduce functionality over data stored in the map reduce cluster as well as data stored in one of data storage services 230. In another example, data processing service(s) 210 may include various types of database services (both relational and non-relational) for storing, querying, and updating data. Such services may be enterprise-class database systems that are highly scalable and extensible. Queries may be directed to a database in data processing service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service(s) 210 may implement, in some embodiments, a data warehouse service, such as discussed below with regard to FIG. 3 that utilizes another data processing service, such as format independent data processing service 220, to execute portions of queries or other access requests with respect to data that is stored in a remote data store, such as data storage service(s) 230 (or a data store external to provider network 200) to implement distributed data processing for distributed data sets.

Format independent data processing service 220, as discussed in more detail below with regard to FIGS. 3-6, may provide a service supporting many different data or file formats for data stored in a centralized data store, like one (or more) of data storage service(s) 230 including data stored in the file formats supported by data processing service(s) 210. Instead of reformatting (if the format of data in remote storage is not supported by the data processing service(s) 210) and moving data from data storage service(s) 230 into the data processing service(s) 210, format independent data processing service 220 may efficiently read data from data storage service(s) 230 according to the data format in which the data is already stored in data storage service(s) 230. Format independent data processing service 220 may perform requested operations, such as scan operations that filter or project data results, aggregation operations that aggregate data values and provide partial or complete aggregation results, sorting, grouping, or limiting operations that organize or reduce the determined data results from data in data storage service(s) 230 in order to minimize the amount of data transferred out of data storage service(s) 230.

For example, format independent data processing service 220 may execute different operations that are part of a larger query plan generated at a data processing service 210 and provide results to the data processing service 210 by relying upon requests from data processing service(s) 210 to determine the different operations to perform. In this way, format independent data processing service 220 may be implemented as a dynamically scalable and stateless data processing service that is fault tolerant without the need to support complex query planning and execution for multiple different data formats. Instead, format independent data processing service 230 may offer a set of data processing capabilities to access data stored in a wide variety of data formats (which may not be supported by different data processing service(s) 210) that can be programmatically initiated on behalf of another data processing client, such as data processing service 210.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, format independent data processing service 220 may access data objects stored in data storage services via the programmatic interfaces (as discussed below with regard to FIGS. 5-6).

Generally speaking, clients 250 may encompass any type of client that can submit network-based requests to provider network 200 via network 260, including requests for storage services (e.g., a request to query a data processing service 210, or a request to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210, format independent data processing service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service, like data warehouse service 300 in FIG. 3 below) or data stored in a data lake hosted in data storage service(s) 230 by performing federated data processing between the data processing service 210 and format independent data processing service 220 (as discussed below with regard to FIG. 5).

Clients 250 may convey network-based services requests (e.g., access requests to read or write data may be directed to data in data storage service(s) 230, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, format independent data processing service 220, and/or data storage service(s) 230 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
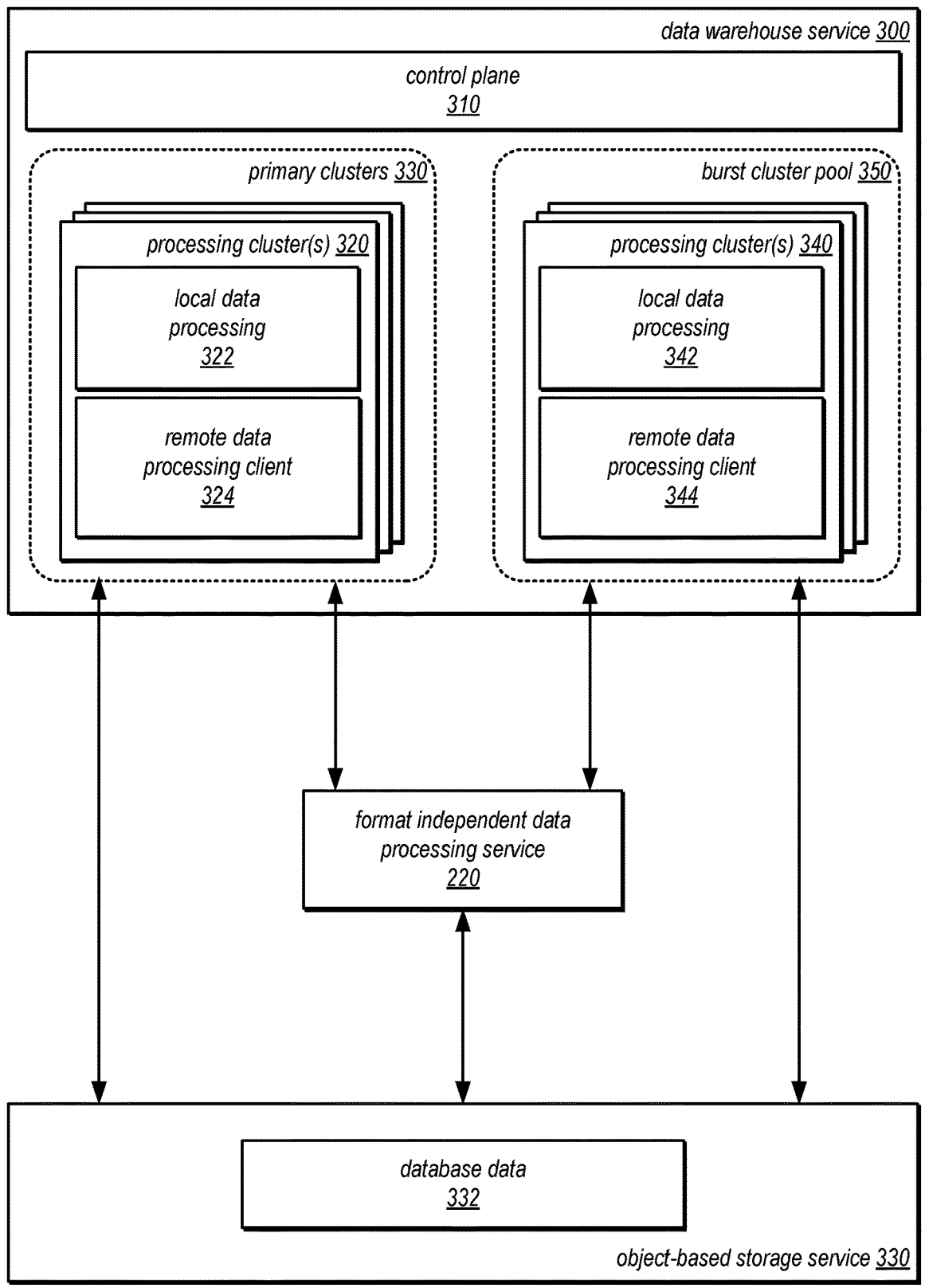
FIG. 3 is a logical block diagram of a data warehouse service implementing primary and burst processing clusters that utilize a format independent data processing service to perform sub-queries to remote data via query engines hosted in a format independent data processing service, according to some embodiments.

In at least some embodiments, one of data processing service(s) 220 may be a data warehouse service. FIG. 3 is a logical block diagram of a data warehouse service implementing primary and burst processing clusters that utilize a format independent data processing service to perform subqueries to remote data via query engines hosted in a format independent data processing service, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 2000 described below with regard to FIG. 12. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300. Control plane 310 may provide or implement access to various metrics collected for the performance of different features of data warehouse service 300, including processing cluster performance and the metrics collected with respect to result cache performance for sub-queries by cache management, in some embodiments.

As discussed above, various clients (or customers, organizations, entities, or users) may wish to store and manage data using a data management service. Processing clusters may respond to various requests, including write/update/store requests (e.g., to write data into storage) or queries for data (e.g., such as a Server Query Language request (SQL) for particular data), as discussed below with regard to FIG. 5, along with many other data management or storage services. Multiple users or clients may access a processing cluster to obtain data warehouse services. In at least some embodiments, a data warehouse service 300 may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320 and 340, hosted by the data warehouse service 300 may provide an enterprise-class database query and management system that allows users to send data processing requests to be executed by the clusters 320, such as by sending a query to a cluster control interface implemented by the network-based service. Processing clusters 320 may perform data processing operations with respect to data stored locally in a processing cluster, as well as remotely stored data. For example, object-based storage service 330 may be a data storage service 230 implemented by provider network 200 that stores remote data, such as backups or other data of a database stored in a cluster. In some embodiments, database data may not be stored locally in a processing cluster 320 but instead may be stored in object-based storage service 330 (e.g., with data being partially or temporarily stored in processing cluster 320 to perform queries). Queries sent to a processing cluster 320 (or routed/redirect/assigned/allocated to processing cluster(s) 340 from processing cluster(s) 320) may be directed to local data stored in the processing cluster and/or remote data. Therefore, processing clusters may implement local data processing, such as local data processing 322 and 342, (discussed below with regard to FIGS. 5 and 6) to plan and execute the performance of queries with respect to local data in the processing cluster, as well as a remote data processing client, such as remote data processing clients 324 and 344, to direct execution of different sub-queries (e.g., operations determined as part of the query plan generated at the processing cluster 320) that are assigned to format independent data processing service 220 with respect to processing remote database data 332).

In some embodiments, data warehouse service 300 may implement primary clusters 330 and burst cluster pool 350. Primary clusters 330 may be reserved, allocated, permanent, or otherwise dedicated processing resources that store and/or provide access to a database for a client of data warehouse service 300, in some embodiments. Burst cluster pool 350 may be a set of warmed, pre-configured, initialized, or otherwise prepared clusters which may be on standby to provide additional query performance capacity for a primary cluster 330. Control plane 310 may manage burst cluster pool 350 by managing the size of burst cluster pool 350 (e.g., by adding or removing processing clusters 340 based on demand). Control plane 310 may determine the capabilities or configuration (which may be different) of processing cluster(s) 340 in burst cluster pool 350 (e.g., maintaining a number of 10 node clusters, 15 node clusters, 20 node clusters, etc.). Processing clusters 340 in burst cluster pool 350 may be obtained or provisioned for a primary cluster 330, as discussed in detail below with regard to FIG. 8.

As databases are created, updated, and/or otherwise modified, snapshots, copies, or other replicas of the database at different states may be stored separate from data warehouse service 300 in object-based storage service 330, in some embodiments. For example, a leader node, or other processing cluster component, may implement a backup agent or system that creates and store database backups for a database to be stored as database data 332 in object-based storage service 330. Database data 332 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 332 may be maintained in some embodiments, so that the latest database data 332 may, for instance, be obtained by a processing cluster in order to perform queries sent for burst query performance.

Figure 4:
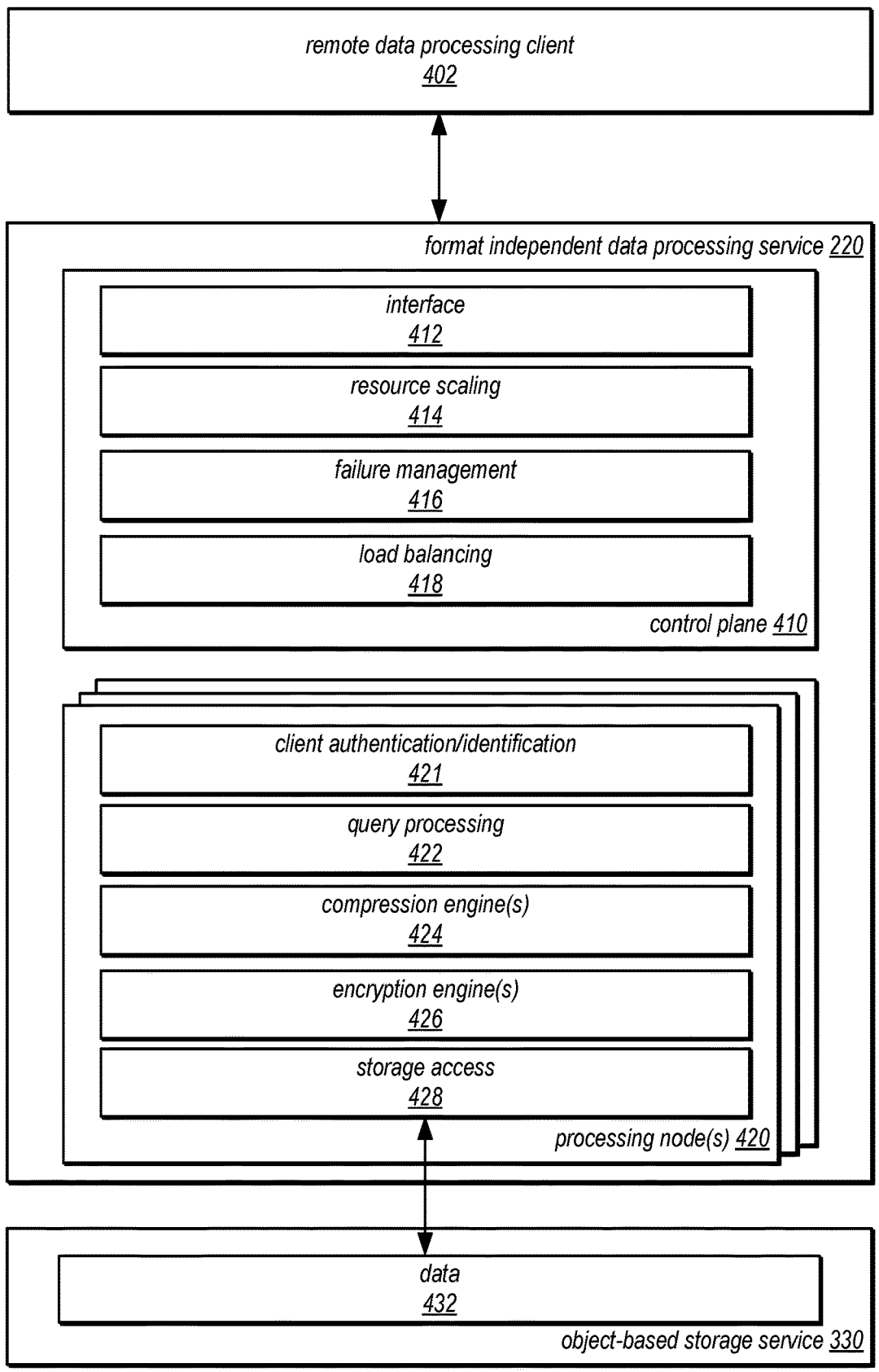
FIG. 4 is a logical block diagram illustrating a format independent data processing service, according to some embodiments.

FIG. 4 is a logical block diagram illustrating a format independent data processing service, according to some embodiments. As noted above in FIG. 2, format independent data processing service 220 may receive requests to perform processing operations with respect to data stored 432 stored in a data storage service (e.g., backup data or other database data, such as other database tables or data that is not stored according to a format, schema, or structure like that of data stored in data warehouse service 300). Processing requests may be received from a client, such as remote data processing client(s) 402 (which may another data processing service 210, like data warehouse service 300 or another data processing client, such as a database engine/cluster or map reduce cluster implemented outside of provider network 200 and communicating with format independent data processing service 220 in order to process queries with respect to data stored within provider network 200 in a data storage service 230 or to process data stored outside of provider network 200 (when the data is made accessible to format independent data processing service 220).

Format independent data processing service 220 may implement a control plane 410 and multiple processing node(s) 420 to execute processing requests received from remote data processing client(s) 402. Control plane 410 may arbitrate, balance, select, or dispatch requests to different processing node(s) 420 in various embodiments. For example, control plane 410 may implement interface 412 which may be a programmatic interface, such as an application programming interface (API), that allows for requests to be formatted according to the interface 412 to programmatically invoke operations. In some embodiments, the API may be defined to allow operation requests defined as objects of code generated at and sent from remote data processing client(s) 402 (based on a query plan generated at remote data processing client(s) 402) to be compiled or executed in order to perform the assigned operations at format independent data processing service 220.

In some embodiments, format independent data processing service 220 may implement load balancing 418 to distribute remote processing requests across different processing node(s) 420. For example, a remote processing request received via interface 412 may be directed to a network endpoint for a load-balancing component of load balancing 418 (e.g., a load balancing server or node) which may then dispatch the request to one of processing node(s) 420 according to a load balancing scheme. A round-robin load balancing, for instance, may be used to ensure that remote data processing requests are fairly distributed amongst processing node(s) 420. However, various other load-balancing schemes may be implemented. As format independent data processing service 220 may receive many remote data processing requests from multiple remote data processing client(s) 402, load balancing 418 may ensure that incoming requests are not directed to busy or overloaded processing node(s) 420.

Format independent data processing service 220 may also implement resource scaling 414. Resource scaling 414 may detect when the current request rate or workload upon a current number of processing node(s) 420 exceeds or falls below over-utilization or under-utilization thresholds for processing nodes. In response to detecting that the request rate or workload exceeds an over-utilized threshold, for example, then resources scaling 414 may provision, spin up, activate, repurpose, reallocate, or otherwise obtain additional processing node(s) 420 to processing received remote data processing requests. Similarly, the number of processing node(s) 420 could be reduced by resource scaling 414 in the event that the request rate or workload of processing node(s) falls below the under-utilization threshold.

Format independent data processing service 220 may also implement failure management 416 to monitor processing node(s) 420 and other components of format independent data processing service 220 for failure or other health or performance states that may need to be repaired or replaced. For example, failure management 416 may detect when a processing node fails or becomes unavailable (e.g., due to a network partition) by polling processing node(s) 420 to obtain health or performance status information. Failure management may initiate shutdown or halting of processing at failing processing node(s) 420 and provision replacement processing node(s) 420.

Figure 12:
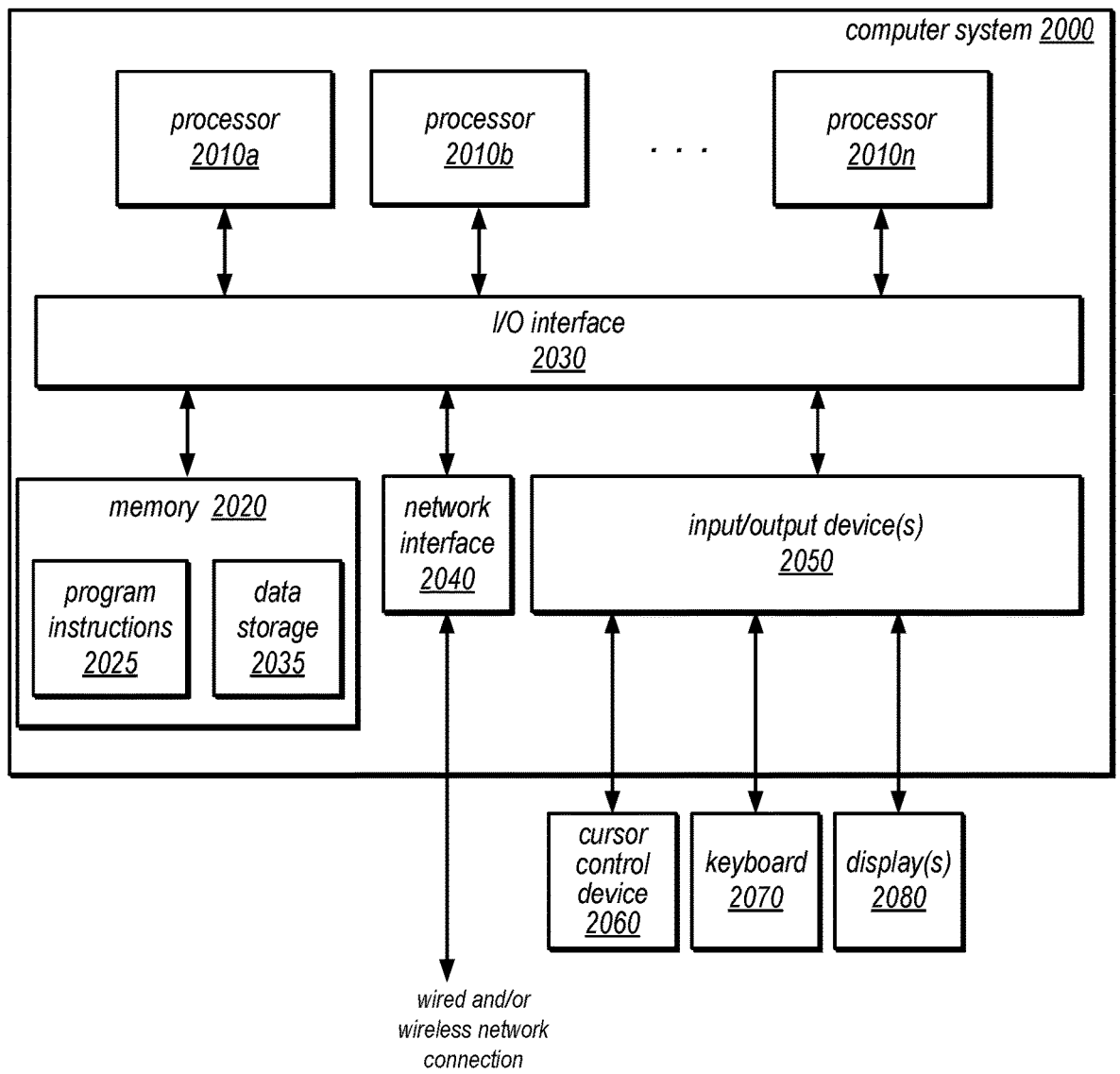
FIG. 12 illustrates an example system that implements the various methods, techniques, and systems described herein, according to some embodiments.

Processing node(s) 420 may be implemented as separate computing nodes, servers, or devices, such as computing systems 2000 in FIG. 12, to perform data processing operations on behalf of remote data processing client(s) 402. Processing node(s) 420 may implement stateless, in-memory processing to execute processing operations, in some embodiments. In this way, processing node(s) 420 may have fast data processing rates. Processing node(s) 420 may implement client authentication/identification 421 to determine whether a remote data processing client 402 has the right to access data 432 in storage service 430. For example, client authentication/identification 421 may evaluate access credentials, such as a username and password, token, or other identity indicator by attempting to connect with storage service 430 using the provided access credentials. If the connection attempt is unsuccessful, then the data processing node 402 may send an error indication to remote data processing client 402.

Processing node(s) 420 may implement query processing 422 or other features of a query engine which may perform multiple different sub-queries (e.g., processing operations) and support multiple different data formats. For example, query processing 422 may implement separate tuple scanners for each data format which may be used to perform scan operations that scan data 432 and which may filter or project from the scanned data, search (e.g., using a regular expression) or sort (e.g., using a defined sort order) the scanned data, aggregate values in the scanned data (e.g., count, minimum value, maximum value, and summation), and/or group by or limit results in the scanned data. Remote data processing requests may include an indication of the data format for data 432 so that query processing 422 may use the corresponding tuple scanner for data 432. Query processing 422 may, in some embodiments, transform results of operations into a different data format or schema according to a specified output data format in the remote data processing request.

In some embodiments, data 432 may be stored in encrypted or compressed format. Processing node(s) 420 may implement compression engine(s) 424 to decompress data 432 according to a compression technique identified for data 432, such as lossless compression techniques like run-length encoding, Lempel-Ziv based encoding, or bzip based encoding. Processing node(s) 420 may implement encryption engine(s) 426 to decrypt data 432 according to an encryption technique and/or encryption credential, such as a key, identified for data 432, such as symmetric key or public-private key encryption techniques.

Processing node(s) 420 may implement storage access 428 to format, generate, send and receive requests to access data 432 in storage service 430. For example, storage access 428 may generate requests to obtain data according to a programmatic interface for storage service 430. In some embodiments, other storage access protocols, such as internet small computer interface (iSCSI), may be implemented to access data 432.

Figure 5:
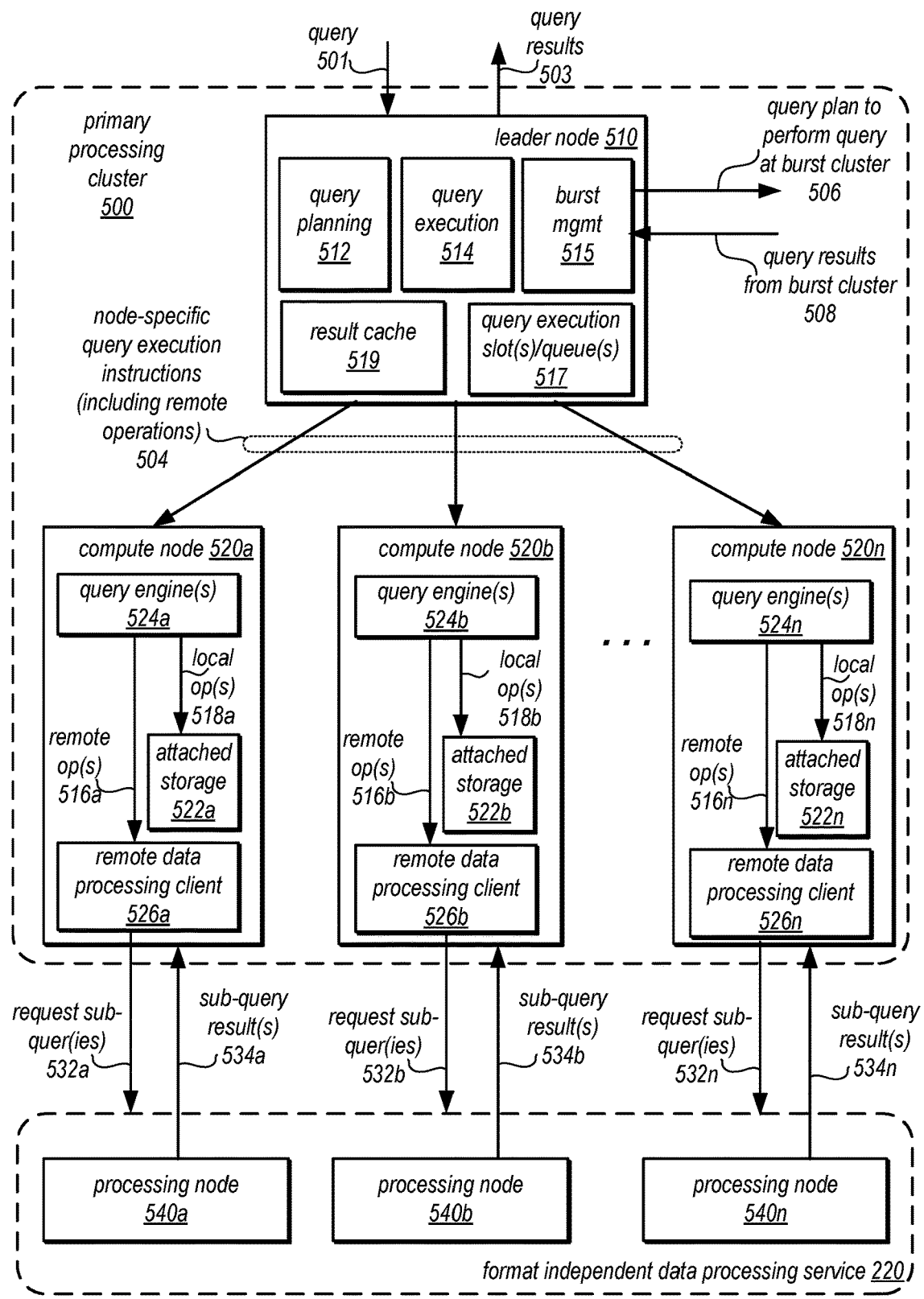
FIG. 5 is a logical block diagram illustrating an example primary processing cluster of a data warehouse service using a format independent data processing service that implements burst manager, according to some embodiments.

FIG. 5 is a logical block diagram illustrating an example primary processing cluster of a data warehouse service using a format independent data processing service that implements burst manager, according to some embodiments. Primary processing cluster 500 may be data warehouse service cluster, like processing clusters 320 discussed above with regard to FIG. 3, or another processing cluster that distributes execution of a query among multiple processing nodes. As illustrated in this example, a primary processing cluster 500 may include a leader node 510 and compute nodes 520a, 520b, and 520n, which may communicate with each other over an interconnect (not illustrated). Leader node 510 may implement query planning 512 to generate query plan(s), query execution 514 for executing queries on primary processing cluster 500 that perform data processing that can utilize remote query processing resources for remotely stored data (e.g., by utilizing one or more query execution slot(s)/queue(s) 517) and burst manager 515 for selecting, routing, directing, or otherwise causing a received query to be performed using burst capacity resources, such as a burst processing cluster 600 in FIG. 6 discussed below. As described herein, each node in a primary processing cluster 500 may include attached storage, such as attached storage 522a, 522b, and 522n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, primary processing cluster 500 may be implemented as part of a data warehouse service, as discussed above with regard to FIG. 3, or another one of data processing service(s) 210. Leader node 510 may manage communications with clients, such as clients 250 discussed above with regard to FIG. 2. For example, leader node 510 may be a server that receives a query 501 from various client programs (e.g., applications) and/or subscribers (users), then parses them and develops an execution plan (e.g., query plan(s)) to carry out the associated database operation(s)). More specifically, leader node 510 may develop the series of steps necessary to obtain results for the query. Query 501 may be directed to data that is stored both locally within processing cluster 500 (e.g., at one or more of compute nodes 520) and data stored remotely (which may be accessible by format independent data processing service 220). Leader node 510 may also manage the communications among compute nodes 520 instructed to carry out database operations for data stored in the processing cluster 500. For example, node-specific query instructions 504 may be generated or compiled code by query execution 514 that is distributed by leader node 510 to various ones of the compute nodes 520 to carry out the steps needed to perform query 501, including executing the code to generate intermediate results of query 501 at individual compute nodes may be sent back to the leader node 510. Leader node 510 may receive data and query responses or results from compute nodes 520 in order to determine a final result 503 for query 501. A database schema, data format and/or other metadata information for the data stored among the compute nodes, such as the data tables stored in the cluster, may be managed and stored by leader node 510. Query planning 512 may account for remotely stored data by generating node-specific query instructions that include remote operations to be directed by individual compute node(s). As discussed in more detail below with regard to FIG. 7, a leader node may implement burst manager 515 to send 506 a query plan generated by query planning 512 to be performed at a burst processing cluster and return results 508 received from the burst processing cluster to a client as part of results 503. In this way, burst query processing may occur without client application changes to establish a separate connection or communication scheme with burst processing resources, allowing for seamless scaling between primary and burst processing capacity.

In at least some embodiments, a result cache 519 may be implemented as part of leader node 510. For example, as query results are generated, the results may also be stored in result cache 519 (or pointers to storage locations that store the results either in primary processing cluster 500 or in external storage locations), in some embodiments. Result cache 519 may be used instead of burst capacity, in some embodiments, by recognizing queries which would otherwise be sent to a burst processing cluster to be performed that have results stored in result cache 519. Various caching strategies (e.g., LRU, FIFO, etc.) for result cache 519 may be implemented, in some embodiments. Although not illustrated in FIG. 4, result cache 519 could be stored in other storage systems (e.g., other storage services, such as a NoSQL database) and/or could store sub-query results for requests to format independent data processing service 220 instead of or in addition to full query results).

Processing cluster 500 may also include compute nodes, such as compute nodes 520a, 520b, and 520n. Compute nodes 520, may for example, be implemented on servers or other computing devices, such as those described below with regard to computer system 2000 in FIG. 12, and each may include individual query processing "slices" defined, for example, for each core of a server's multi-core processor, one or more query processing engine(s), such as query engine(s) 524a, 524b, and 524n, to execute the instructions 504 or otherwise perform the portions of the query plan assigned to the compute node. Query engine(s) 524 may access a certain memory and disk space in order to process a portion of the workload for a query (or other database operation) that is sent to one or more of the compute nodes 520. Query engine 524 may access attached storage, such as 522a, 522b, and 522n, to perform local operation(s), such as local operations 518a, 518b, and 518n. For example, query engine 524 may scan data in attached storage 522, access indexes, perform joins, semi joins, aggregations, or any other processing operation assigned to the compute node 520.

Query engine 524a may also direct the execution of remote data processing operations, by providing remote operation(s), such as remote operations 516a, 516b, and 516n, to remote data processing clients, such as remote data processing client 526a, 526b, and 526n. Remote data processing clients 526 may be implemented by a client library, plugin, driver or other component that sends request sub-queries, such as sub-quer(ies) 532a, 532b, and 532n to format independent data processing service 220. As noted above, in some embodiments, format independent data processing service 220 may implement a common network endpoint to which request sub-quer(ies) 532 are directed, and then may dispatch the requests to respective processing nodes, such as processing nodes 540a, 540b, and 540n. Remote data processing clients 526 may read, process, or otherwise obtain results from processing nodes, including partial results of different operations (e.g., aggregation operations) and may provide sub-query result(s), including result(s) 534a, 534b, and 534c, back to query engine(s) 524, which may further process, combine, and or include them with results of location operations 518.

Compute nodes 520 may send intermediate results from queries back to leader node 510 for final result generation (e.g., combining, aggregating, modifying, joining, etc.). Remote data processing clients 526 may retry sub-query request(s) 532 that do not return within a retry threshold. As format independent data processing service 220 may be stateless, processing operation failures at processing node(s) 540 may not be recovered or taken over by other processing nodes 540, remote data processing clients 526 may track the success or failure of requested operation(s) 532, and perform retries when needed.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 6:
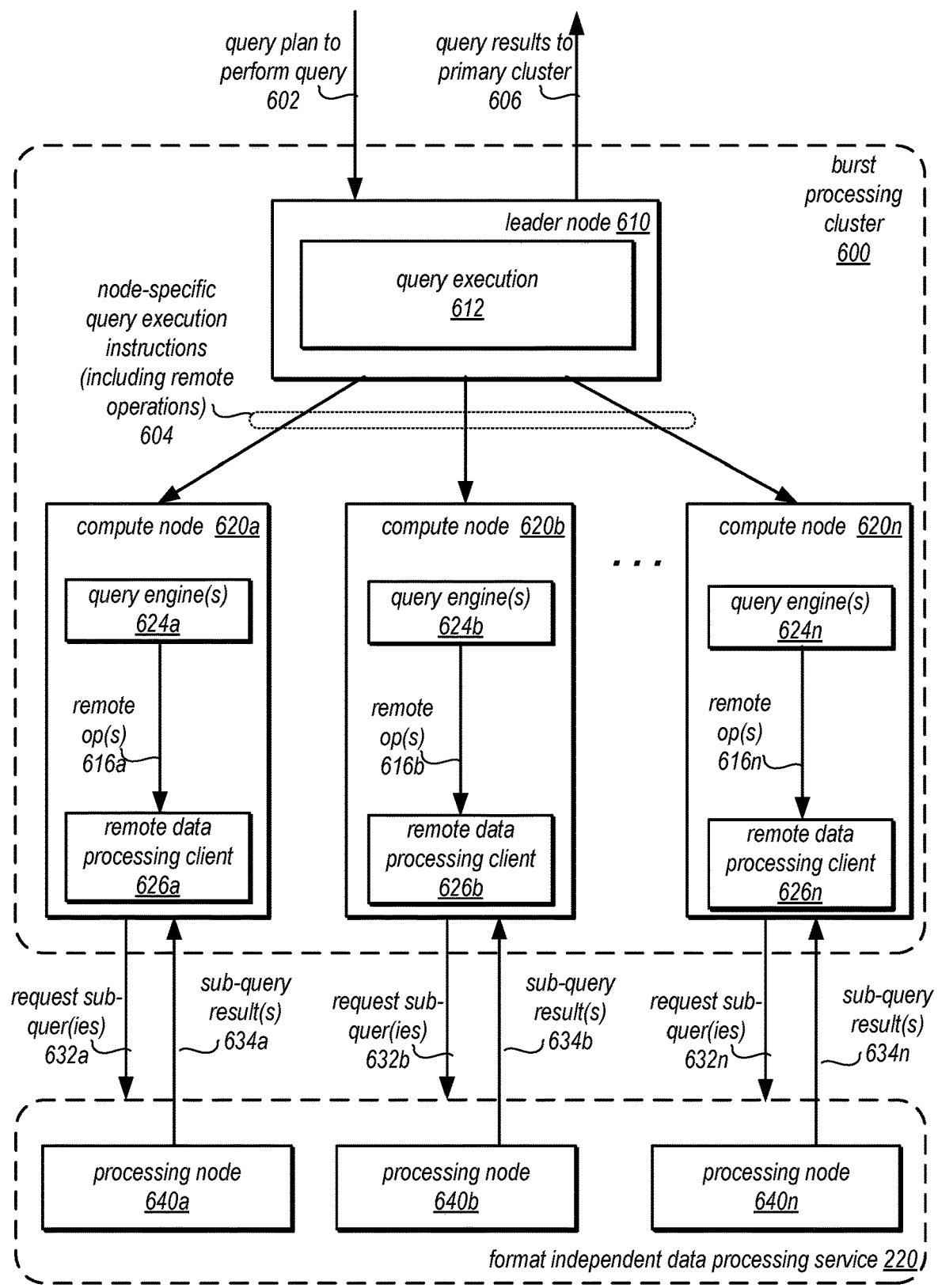
FIG. 6 is a logical block diagram illustrating an example burst processing cluster of a data warehouse service using a format independent data processing service to perform queries sent to the burst processing cluster, according to some embodiments.

FIG. 6 is a logical block diagram illustrating an example burst processing cluster of a data warehouse service using a format independent data processing service to perform queries sent to the burst processing cluster, according to some embodiments. Similar to primary processing cluster 500 in FIG. 5, burst processing cluster 600 may include a leader node 610 and compute nodes 620a, 620b, and 620n, which may communicate with each other over an interconnect (not illustrated). Leader node 610 may implement query execution 612 for executing queries on burst processing cluster 600. For example, leader node 610 may receive a query plan 602 to perform a query from a primary processing cluster. Query execution 612 may generate the instructions or compile code to perform the query according to the query plan. Leader node 610 may also manage the communications among compute nodes 620 instructed to carry out database operations for data stored in the burst processing cluster 600. For example, node-specific query instructions 604 may be generated or compiled code by query execution 612 that is distributed by leader node 610 to various ones of the compute nodes 620 to carry out the steps needed to perform query plan 602, including executing the code to generate intermediate results of the query at individual compute nodes may be sent back to the leader node 610. Leader node 610 may receive data and query responses or results from compute nodes 620 in order to determine a final result 606 for the query to be sent back to the primary processing cluster.

In at least some embodiments, burst processing cluster 600 may not maintain a local copy of the database, but instead may access a backup of the database (or the database directly which may not be maintained locally at primary processing clusters) via format independent data processing service 220. For example, query engine 624a may direct the execution of remote data processing operations, by providing remote operation(s), such as remote operations 616a, 616b, and 616n, to remote data processing clients, such as remote data processing client 626a, 626b, and 626n, in order to retrieve data from the database data in object storage service 330 to perform the query. As noted earlier, remote data processing clients 626 may be implemented by a client library, plugin, driver or other component that sends request sub-queries, such as sub-quer(ies) 632a, 632b, and 632n to format independent data processing service 220. As noted above, in some embodiments, format independent data processing service 220 may implement a common network endpoint to which request sub-quer(ies) 632 are directed, and then may dispatch the requests to respective processing nodes, such as processing nodes 640a, 640b, and 640n. Remote data processing clients 626 may read, process, or otherwise obtain results from processing nodes, including partial results of different operations (e.g., aggregation operations) and may provide sub-query result(s), including result(s) 634a, 634b, and 634c, back to query engine(s) 624, which may further process, combine, and or include them with results of location operations 618. In at least some embodiments, processing nodes 640 may filter, aggregate, or otherwise reduce or modify data from the database backups used to perform the query in order to lessen the data transferred and handled by burst processing cluster 600, increasing the performance of the query at burst processing cluster 600. Although not illustrated in FIG. 6, some burst processing clusters may implement local attached storage and local processing similar to primary processing cluster 500 in FIG. 5. For example, a burst processing cluster that was scheduled for a period of time that exceeds some threshold value (e.g., greater than 1 hour) may read and store in persistent storage database data from the database data (e.g., directly or via format independent data processing service 220), in some embodiments.

Although not illustrated in FIGS. 5 and 6, further communications between a primary processing cluster and burst processing cluster may be implemented. For example, database metadata may be obtained at burst processing cluster 600 from a database backup and then updated as updates are made at the primary processing cluster, in some embodiments, as discussed below with regard to FIG. 8. In some embodiments, compute nodes 620 (or leader node 610) may request data directly from compute nodes 520 in primary processing cluster 500), such as updated data blocks in a table of a database. In at least one embodiment, all of the data used to perform a query may be obtained by compute nodes 620 from compute nodes 520 instead of utilizing format independent data processing service 220 and a backup in a separate data store.

In at least some embodiments, burst processing cluster 600 may be a single tenant resource, only performing burst queries for one database (or client or user account). In some embodiments, burst processing cluster 600 may be a multi-tenant environment, handling burst queries for different databases, different user accounts and/or different clients. In such scenarios, security techniques to prevent data from being visible to unauthorized users may be implemented.

Figure 7:
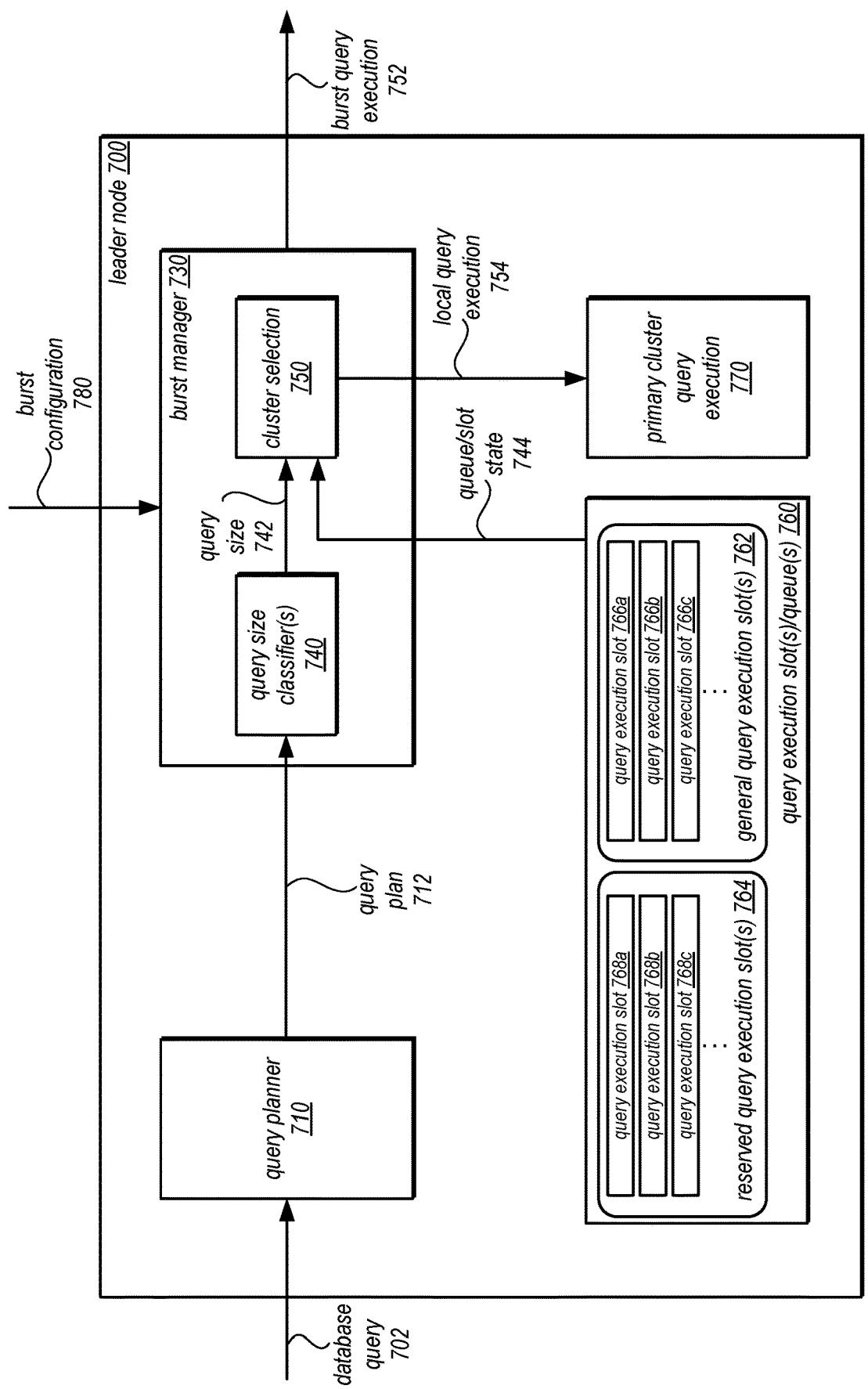
FIG. 7 is a logical block diagram illustrating an example of burst processing management at a primary cluster of a data warehouse service, according to some embodiments.

FIG. 7 is a logical block diagram illustrating an example of burst processing management at a primary cluster of a data warehouse service, according to some embodiments. Leader node 700 may be similar to leader node 510 in FIG. 5. Leader node 700 may implement query planner 710 to handle a received database query 702. For example, query planner 710 may perform various query planning techniques, such as generating a parse tree from a query statement, applying various rewrites or rules-based optimizations to modify the parse tree (e.g., reordering different operations such as join operations), generating different plans for performing the parsed/modified tree, and applying cost estimation techniques to determine estimated costs of the different plans in order to select a least costly plan as the query plan 712 to perform query 702.

As illustrated in FIG. 5, burst manager 730 may be implemented by leader node to select the cluster to perform database query 702, in some embodiments. For example, burst manager 730 may implement query size classifier(s) 740, which may apply one or more size classifiers to the query plan in order to classify a size of the query, (e.g., "small/short," "medium," or "large/long" queries). For instance, a rules-based decision engines for classifying the size of a query may be applied (e.g., which may apply different rules to features of the query, such as the size of the table being queried, the type of operations (e.g., joins and/or scans), the source of the query (e.g., which client application or user account, by checking to see if the query has been performed before and how long it performed, number of storage locations accessed, types of queries that cannot by definition be "small" or "medium", etc.). In some embodiments, query size classifier(s) may be trained using machine learning techniques so that when a size classifier 740 is applied to features of the plan, a probability indicative of a size of the database query may be generated, in some embodiments. For example, a linear classifier may be applied to score the features of the query plan according to a weighted sum of the features (e.g., by applying coefficients to the features determined from training the classifier according to logistic regression). In some embodiments, other features in addition to the query plan may be considered, such as the source of the query (e.g., what user submitted the query), time of day, what table(s) are identified in the query, among others. The output of the classifier may be a probability value, in various embodiments.

The probability value may be compared to a classification threshold, in some embodiments. For example, if the greater the probability value indicates the longer a query is likely to run and thus a greater size, then ranges of probabilities may correspond to different sizes (e.g., "small," "medium," or "large" queries), in some embodiments. In some embodiments, separate size classifiers, such as a classifier for small queries, a classifier for medium queries, and a classifier for large queries may be applied to select as the size the classification with the highest confidence score. In some embodiments query size classifier(s) 740 may be implemented separately from burst manager 730 (e.g., as part of a general workload manager (not illustrated) to assign queries to reserved query execution slot(s) 764 and/or general query execution slot(s) 762 according to size classification). Therefore the arrangement of features illustrated in FIG. 7 is not to be considered as limiting to other arrangements of features to plan or execute queries, in some embodiments.

Query size 742 may be provided to cluster selection 750, in some embodiments. Cluster selection 750 may apply different criteria or other thresholds according to the size classification (e.g., a "medium" query is greater than a threshold that applies rules for "small" queries), in some embodiments. As discussed in detail below with regard to FIG. 10, the user, workload, allocation, or otherwise state of the primary processing cluster as indicated by queue/slot sate 744 may also be used to make cluster selections. For example, query execution slot(s)/queue(s) 760 may be maintained as part of leader node 700, in some embodiments. Query execution slot(s)/queue(s) 760 may, in some embodiments, be implemented as part of a queue (not illustrated). A query execution slot, such as query execution slots 766*a*, 766*b*, 766*c*, 768*a*, 768*b*, and 768*c*, may identify a process that is allocated a certain portion of computing resources at a processing cluster (e.g., processor, memory, I/O bandwidth, network bandwidth, etc.) to perform a query assigned to that slot. As illustrated in FIG. 7, some query execution slots may be reserved 764 for queries identified according to a query size (e.g., "small" queries). A minimum number of query execution slots in reserved short query execution resources 764, such as execution slots 768, may be maintained so that only queries identified as of the appropriate size (e.g., "small") can be performed on the reserved slots 768. Other slots, such as slots 762, may remain available for general query execution (e.g., execution of queries of all sizes), in some embodiments.

Cluster selection 750 may direct the query for local query execution 754, in some embodiments. Primary cluster query execution 770 may generate the instructions and/or code to perform the query, as discussed above (e.g., like query execution 514). Alternatively, cluster selection 750 select a burst processing cluster to perform the query, and provide a request, instruction, or other indication to perform burst query execution 752, in some embodiments. In at least some embodiments, further query planning to adapt the query plan to the burst cluster may be performed (not illustrated). For example, the number of nodes in the burst processing cluster may be different, which may result in a different division of work in the query plan. Instructions may also be included for accessing data through format independent data processing service 220 (e.g., storage object locations, access credentials, including specialized operators or instructions to leverage format independent data processing service 220 in the plan), in some embodiments.

In at least some embodiments, burst manager 730 may be configured via user and/or control plane requests. For example, as discussed below with regard to FIG. 8, events that trigger the request for a burst processing cluster may be specified (e.g., scheduled time periods that a burst cluster may be active, the level of utilization of query execution slot(s)/queue(s) 760 before using a burst cluster, to enable/disable predictive burst processing which may allow burst manager 730 to perform time series or other types of analysis to determine when burst capacity may be needed for a database and preemptively obtain burst processing cluster(s) to meet the determined need), in some embodiments. In some embodiments, burst configuration 780 may be performed as part of other workload management interfaces or settings for a database or primary processing cluster. For example, some query execution slots or queues may be identified as non-burstable (e.g., so that a query cannot be removed from the queue/slot and sent to the burst processing cluster instead). Bursting could be enabled/disabled for specified users/applications, in some embodiments, via burst configuration 780.

In at least some embodiments, burst configuration 780 may allow users (or the control) to specify via an interface when burst performance of queries may be enabled or disabled for a primary processing cluster. For example, burst can be enabled/disabled automatically in order to optimize for cost or performance, in some embodiments. A maximum queue time or other performance criteria for the primary processing cluster could be specified as part of burst configuration 780 for queries, for instance, may determine when bursting should occur (e.g., if queries would exceed the queue time then begin using bust capacity). In some embodiments, a burst budget (e.g., a cost limitation for using burst processing clusters) or other limitation may be specified as part of burst configuration 780 in order to allow a user/client application to indicate when burst should stop so that the budget or other limitation is not exceeded (e.g., for a given time period, such as a day, week, month, etc.).

Figure 8:
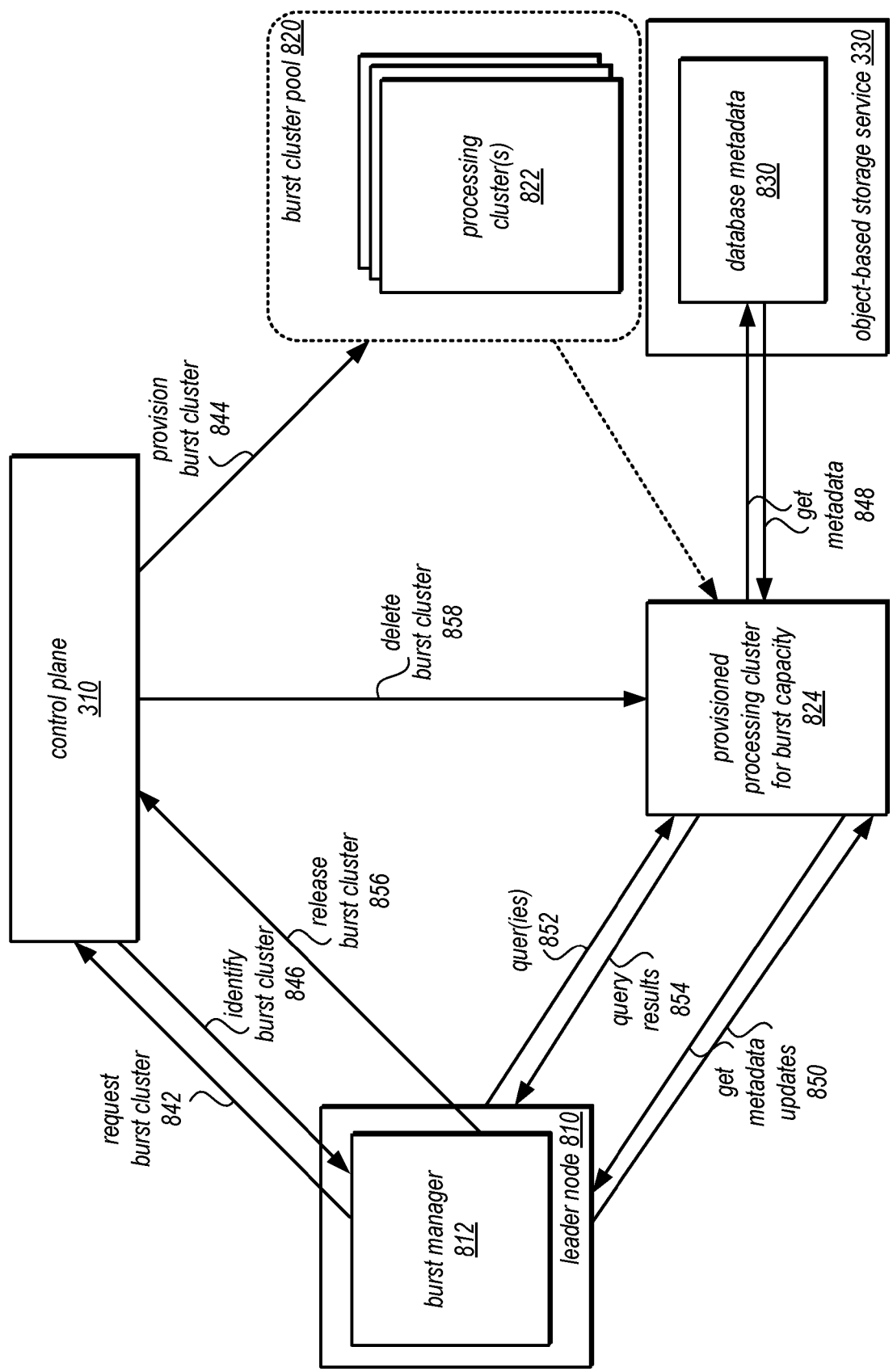
FIG. 8 is a logical block diagram illustrating example interactions to obtain and release a burst processing cluster from a pool of burst processing clusters, according to some embodiments.

FIG. 8 is a logical block diagram illustrating example interactions to obtain and release a burst processing cluster from a pool of burst processing clusters, according to some embodiments. Burst manager 812 at leader node 810 may detect or determine when to obtain a burst cluster for performing queries in various scenarios, as discussed below with regard to FIG. 11. Burst manager 812 may then request a burst cluster 842 from control plane 310. The request may, in some embodiments, specify a type of burst cluster. In some embodiments, control plane 310 may evaluate a manifest, index, or other data that describes available processing cluster(s) 822 in burst cluster pool 820 in order to satisfy the request. For example, control plane 310 may identify a processing cluster that matches (or best matches) the specified configuration of the burst cluster request, in some embodiments. In some embodiments, control plane 310 may identify a burst cluster that was previously used for performing queries to the database hosted by the cluster of leader node 810.

Control plane 310 may provision 844 the burst cluster, in some embodiments, from burst cluster pool, such as provisioned burst cluster 824. Provisioning a burst cluster may include various operations to configure network connections between provisioned processing cluster for burst capacity 824 and leader node 810 and other services (e.g., format independent data processing service 220, object storage service 330, etc.). In some embodiments, access credentials, security tokens, and/or encryption keys may be provided so that provisioned processing cluster for burst capacity 824 can access and database data to perform queries for the database. In some embodiments, initialization procedures, workflows or other operations may be started by control plane 310 at provisioned processing cluster for burst capacity 824. For example, provisioned processing cluster for burst capacity 824 may get metadata 848 from object-based storage service 330 that is stored as part of database metadata 830 in a database backup in order to perform queries to the database. In some embodiments, provisioned processing cluster for burst capacity 824 may get metadata updates 850 directly from leader node 810 (or other nodes in a primary processing cluster) in order to catch up the metadata to account for changes that occurred after the backup was stored.

Once provisioning is complete, provisioned processing cluster for burst capacity 824 may be made available for performing queries. Control plane 310 may identify the burst cluster 846 to leader node 810 (e.g., by providing a network endpoint for provisioned cluster 824), in some embodiments. Leader node 810 may then begin directing selected queries 852 to provisioned cluster 824, which may perform the queries and send back query results 854 to leader node 810, which may provide the results to a client in turn. In this way, a client application does not have to learn of and receive requests from a second location, provisioned cluster 824 when burst performance is used, in some embodiments.

When an event that triggers release of the burst cluster occurs, burst manager 812 may send a request to control plane 310 to release the burst cluster 856 (e.g., by including the identifier of the provisioned cluster 824). Control plane 310 may then delete the burst cluster 858 (e.g., by removing/deleting data and/or decommissioning/shutting down the host resources for the provisioned cluster 824).

Although FIGS. 2-8 have been described and illustrated in the context of a provider network implementing different data processing services, like a data warehousing service, the various components illustrated and described in FIGS. 2-8 may be easily applied to other data processing systems that can utilize additional query engines to provide for burst query performance capacity. As such, FIGS. 2-8 are not intended to be limiting as to other embodiments of caching results for sub-queries to different data store locations.

Figure 9:
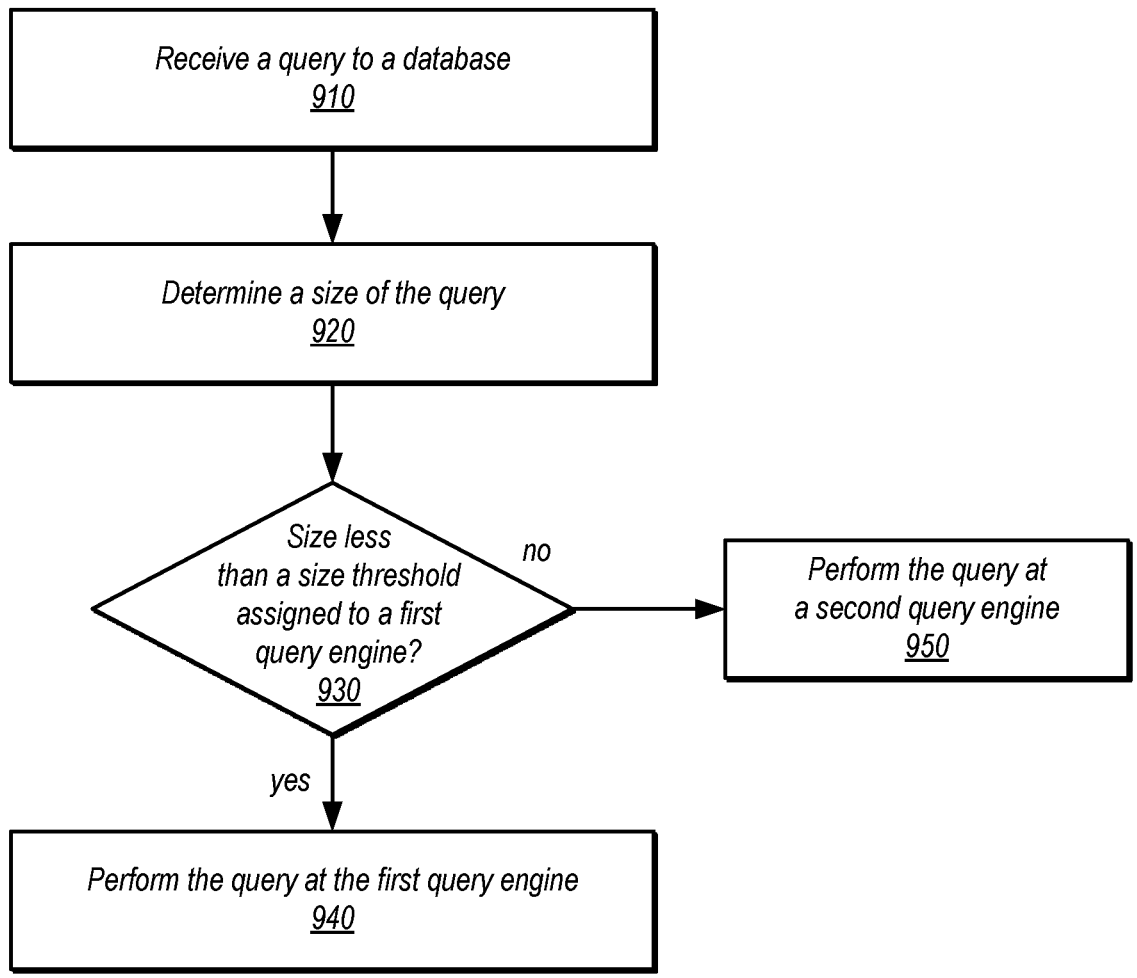
FIG. 9 is a high-level flowchart illustrating methods and techniques to implement burst performance of database queries according to query size, according to some embodiments.

FIG. 9 is a high-level flowchart illustrating methods and techniques to implement burst performance of database queries according to query size, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network, an intermediate data processing service in a second provider network, and a data set stored in a service of a third provider network). Different types of query engines or non-distributed query performance platforms may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 910, a database query may be received, in various embodiments. The database query may be received according to various interfaces, formats, and/or protocols. For example, the database query may be formatted according to a query language such as Structured Query Language (SQL), in some embodiments, or may be specified according to an Application Programming Interface (API) for receiving queries. In at least some embodiments, the database query may be one query of many queries that can be submitted by one or many different users to a same database engine, processing platform, or system. For example, the database query may compete for computing resources along with other queries received from other users to be executed with respect to a database in some embodiments. In at least some embodiments, the query may be received at the first query engine (e.g., received at a primary processing cluster as discussed above with regard to FIGS. 5-7). In other embodiments, the query may be received at another query engine or at a request router.

As indicated at 920, a size of the query may be determined, in some embodiments. For example, as discussed above with regard to FIG. 7, size classifiers trained on the performance of previous database queries may be used to evaluate features of a received database query and identify a probability that the query is similar in size to a known size of a previous query, in some embodiments. These classification techniques may be dynamically updated so that as the size of queries received changes over time, in some embodiments, so that the determined size for a received query may adjust accordingly (e.g., "small/short" queries may change from less than 5 seconds to less than 10 seconds over time). Other classification techniques, including performance timeouts (e.g., performing a query until it runs longer than a threshold so that it can be determined to have a size longer than a threshold) may be implemented, in some embodiments. In some embodiments, a size of a query may be indicative of resource utilization, amount of data to be read, expected size of results, or other indication of work or cost to perform the query, and thus the previous examples discussing time are not intended to be limiting.

As indicated at 930, a determination as to whether the determined size is less than a size threshold assigned to a first query engine may be made, in some embodiments. For example, "small" queries may be classified so that any non-small classified query would be considered to exceed the size threshold assigned to a query engine (e.g., a small query processing threshold), in some embodiments. In some embodiments, the size threshold may be a length of time, amount of IO operations (IOPs), amount of data accessed, or other query size measure. If the size is less than the size threshold, then the query may be performed at the first query engine, as indicated at 940. If, however, the size is greater than or equal to the size threshold, then the query may be performed at the second query engine, as indicated at 950, in some embodiments.

Various exceptions, alternative conditions, or further evaluations may be performed for queries greater than or equal to the size threshold in order to determine to perform it at the second query engine, which may be the burst performance resource, in some embodiments. For instance, FIG. 10, discussed below provides various different scenarios in which a query may still be performed at the first query engine if the size is greater than or equal to the size threshold which are not illustrated.

Figure 10:
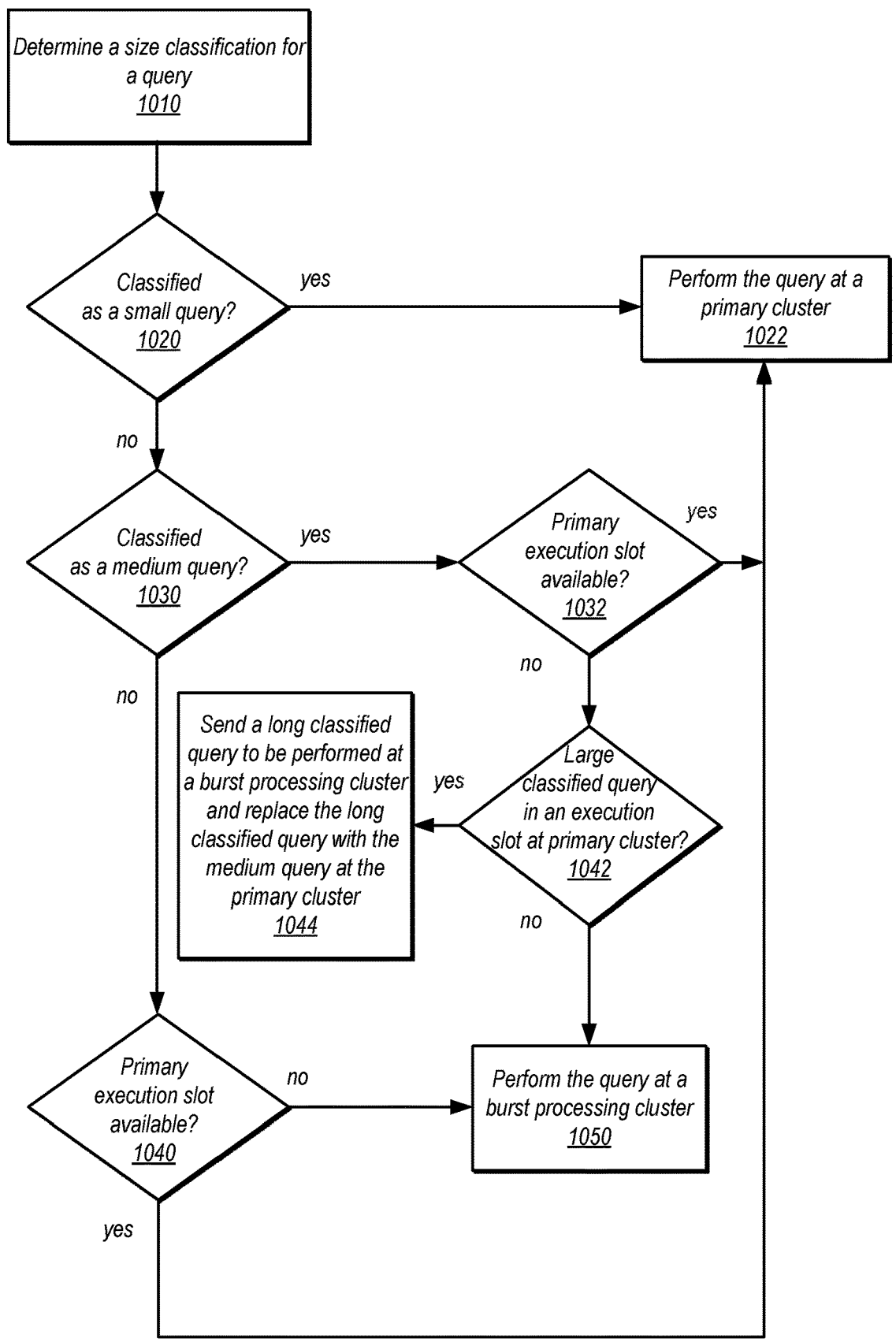
FIG. 10 is a high-level flowchart illustrating methods and techniques to implement select between a primary and burst processing cluster according to a query size classification, according to some embodiments.

FIG. 10 is a high-level flowchart illustrating methods and techniques to implement select between a primary and burst processing cluster according to a query size classification, according to some embodiments. As indicated at 1010, a size classification may be determined for a query, in some embodiments. Different size classification models corresponding to different sizes, for instance, may be implemented and applied to identify a size classification. In some embodiments, a single classification model or schema may be applied which can select or determine a size classification (e.g., size probability ranges mapped to different size classifications as discussed above). Example size classifications, "short/small" "medium" and "long/large" may be used, in some embodiments, as discussed below—though various other classifications could be utilized in other embodiments (e.g., based on the size metrics, such as time spent, amount of data accessed, etc.).

As indicated at 1020, if a query is classified as a small query then it may be performed at a primary cluster, in some embodiments, as indicated at 1022. In at least some embodiments, small queries may be performed using reserved execution resources, such as reserved execution slots or queues as discussed above in FIG. 7.

As indicated at 1030, if a query is classified as a medium query, then further evaluations may be performed. For example, a determination may be made as to whether an execution slot at the primary cluster is available, as indicated at 1032. If so, then the primary cluster may be used to perform the query, as indicated at 1022. If no primary execution slot is available, as indicated by the negative exit from 1032, then further evaluations may be performed. For example, whether a query classified as large exists in an execution slot at a primary cluster may be determined, as indicated at 1042. If so, then the classified query may be sent to a burst processing cluster and the medium query may replace the large classified query to be performed at the primary cluster, as indicated at 1044, in some embodiments. Different techniques for selecting the large query may be performed if more than one large query is in an execution slot. For example, the large query that has been running the least may be selected and sent to the burst processing cluster in order to minimize the amount of lost work, in some embodiments.

As indicated by the negative exit from 1042, if no long query is executing in an execution slot at the primary cluster, the query may be performed at the burst processing cluster, as indicated at 1050, in some embodiments. For a query that is large (e.g., not small or medium), then a determination may be made as to whether a primary execution slot is available, as indicated at 1040. If so, then as indicated by the positive exit from 1040, the query may be performed at the primary processing cluster. If not, then as indicated by the negative exit from 1040, the query may be performed at the burst processing cluster, in some embodiments.

Figure 11:
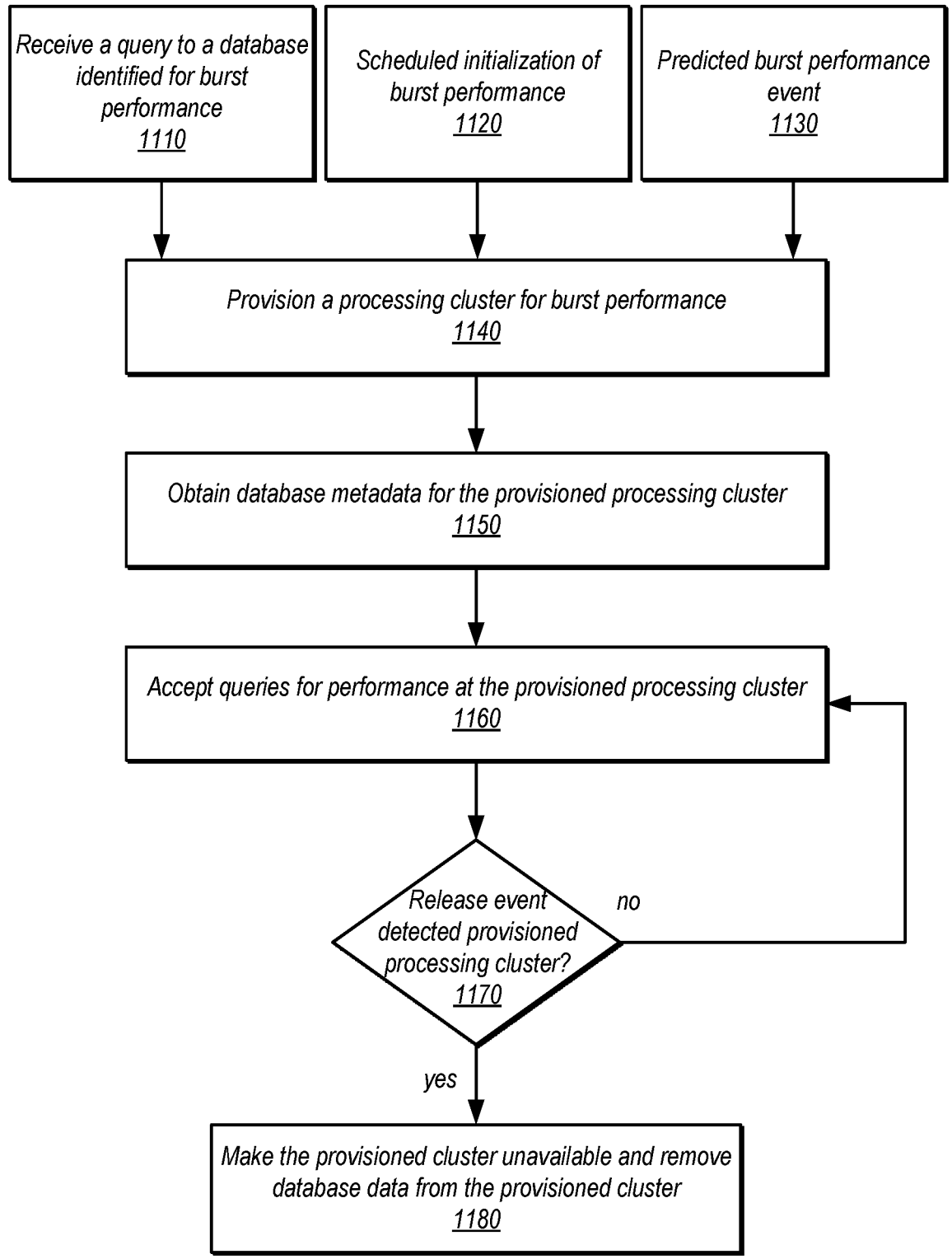
FIG. 11 is a high-level flowchart illustrating methods and techniques to implement provisioning of burst processing clusters, according to some embodiments.

FIG. 11 is a high-level flowchart illustrating methods and techniques to implement provisioning of burst processing clusters, according to some embodiments. Different scenarios may trigger the provisioning of burst capacity for performing database queries. As indicated at 1110, a query may be received at a database that is identified for burst performance (e.g., according to the techniques discussed above) which may trigger provisioning of a processing cluster for burst performance, as indicated at 1140, in some embodiments. Scheduled initialization/enablement of burst performance, as indicated at 1120, may also trigger provisioning of a processing cluster, in some embodiments. For example, a user can specify a schedule for adding one or more processing clusters to a database via a user interface (e.g., graphical, programmatic, command line, etc.) that identifies a time period and number of additional processing clusters). As indicated at 1130, a predicted burst performance event can trigger provisioning of a processing cluster for burst performance, in some embodiments. For example, a time series analysis of past query workloads and burst provisioning for a database may provide indicators or features for predicting a need to add processing cluster(s) for burst performance, in some embodiments.

As indicated at 1150, database metadata may be obtained for the provisioned processing cluster, in some embodiments. A database backup may be accessed for instance, in order to obtain the data. In some embodiments, database metadata may be obtained directly from the hosts of the database (e.g., from a primary cluster). As indicated at 1160, the provisioned processing cluster may be made available for accepting queries from the primary processing cluster, in some embodiments.

A release event may be detected for a provisioned processing cluster, as indicated at 1170, in some embodiments. A release event may be a scheduled release of provisioned processing cluster, in some embodiments. A release event may be an expiration of a period of time in which no queries are performed using the provisioned processing cluster, in some embodiments. A release event may be a user specified limitation on provisioning, such as a budget or other cost limitation for utilizing the provisioned processing cluster. Once detected, the provisioned cluster may be made unavailable and database data may be removed from the provisioned cluster, as indicated at 1180. For example, the provisioned cluster may be instructed (e.g., by a control plane) to reject received queries. The provisioned processing cluster may perform a scrub operation, reboot, or shutdown in order to delete or otherwise remove database data (e.g., to prevent the database data from becoming visible to other users that could access the provisioned cluster for another database.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of burst performance of database queries according to query size as described herein may be executed on one or more computer systems, which may interact with various other devices. One such computer system is illustrated by FIG. 12. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 1010 coupled to a system memory 1020 via an input/output (I/O) interface 1030. Computer system 2000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 2000. Generally speaking, a non-transitory, computer-readable storage medium may include storage media or memory media such as magnetic or optical media, e.g., disk or CD/DVD-ROM coupled to computer system 2000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 2000 and other devices attached to a network, such as other computer systems, or between nodes of computer system 2000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 2000. Multiple input/output devices 1050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 1040.

As shown in FIG. 12, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a first one or more computing devices, comprising at least one processor and memory, that implement a first query engine configured to:
      receive a first query to a database at a first query engine;
      determine a size of the first database query using a size classifier, wherein the size classifier is a machine learning model trained according to a machine learning technique using query plans to make size predictions for database queries, wherein the machine learning model takes as input a first query plan generated by the first query engine and produces as output a probability that the first database query is the size, wherein the size is determined according to an evaluation of the probability output from the machine learning model;
      determine that the size of the first query is less than a size threshold to perform queries to the database at the first query engine using the size classifier that takes as input a second query plan generated by the first query engine;
      perform the first query to the database at the first query engine based at least in part on the determination that the size of the first query is less than the size threshold to perform queries to the database at the first query engine;
      receive a second query to the database at the first query engine;
      determine, at the first query engine that performed the first query to the database, a size of the second database query;
      determine, at the first query engine that performed the first query to the database, that the size of the second query is greater than or equal to the size threshold to perform queries to the database at the first query engine; and
      after the determination at the first query engine that performed the first query that the size of the second query is greater than or equal to the size threshold to perform queries to the database at the first query engine, send, by the first query engine that performed the first query to the database, the second query along with the second query plan to a second query engine provisioned for additional capacity to handle increases in workload directed to the database; and
   a second one or more computing devices, comprising a second processor and a second memory, that implement the second query engine, configured to:
      receive, by the second query engine, the second query from the first query engine; and
      perform the second query to the database at a second query engine.

2. The system of claim 1, wherein the one or more computing devices are further configured to: provision the second query engine from a pool of query engines for burst query performance.

3. The system of claim 2, wherein the provisioning of the second query engine from the pool of query engines is performed in response to the receipt of the second query at the first query engine.

4. The system of claim 1, wherein the first query engine is a primary processing cluster implemented as part of a data warehouse service offered by a provider network that stores the database, wherein the second query engine is a burst processing cluster implemented as part of the provider network, and wherein to perform the second query at the burst processing cluster, the one or more computing devices are further configured to:
   send one or more requests to retrieve data of the database to a format independent data processing service of the provider network that accesses data of the database to respond to the one or more requests.

5. A method, comprising:
   performing a first query to a database at a first query engine based at least in part on a size of the first query being less than a size threshold to perform queries to the database at the first query engine, wherein the size of the first query is determined using a size classifier, wherein the size classifier is a machine learning model trained according to a machine learning technique using query plans to make size predictions for database queries, wherein the machine learning model takes as input a first query plan generated by the first query engine and produces as output a probability that the first database query is the size, wherein the size is determined according to an evaluation of the probability output from the machine learning model;
   determining, at the first query engine that performed the first query to the database, that a size of a second query is greater than or equal to the size threshold to perform queries to the database at the first query engine, wherein the size of the second query is determined using the size classifier that takes as input a second query plan generated by the first query engine for the second query;
   after the determination at the first query engine that performed the first query that the size of the second query is greater than or equal to the size threshold to perform queries to the database at the first query engine, send, by the first query engine that performed the first query to the database, the second query along with the second query plan to a second query engine provisioned for additional capacity to handle increases in workload directed to the database;
   receive, at the second query engine, the second query from the first query engine; and
   performing the second query to the database at a second query engine.

6. The method of claim 5 further comprising:
   receiving a third query to the database, wherein the third query is a size greater than or equal to the size threshold; and
   performing the third query at the first query engine.

7. The method of claim 6, further comprising:
   removing a fourth query from an execution slot at the first query engine to be performed at the second query engine, wherein the third query is performed at the first query engine in the execution slot from which the fourth query was removed.

8. The method of claim 5, further comprising provisioning the second query engine from a pool of query engines for burst query performance.

9. The method of claim 8, wherein the provisioning of the second query engine from the pool of query engines is performed in response to receiving the query at the first query engine.

10. The method of claim 8, wherein the provisioning of the second query engine from the pool of query engines is performed in response to determining a predicted burst performance event for the database based, at least in part, on a plurality of previously received queries to the database.

11. The method of claim 8, further comprising releasing the second query engine from performing queries to the database responsive to a exceeding a user-specified limitation for burst query performance.

12. The method of claim 5, further comprising:
receiving a third query to the database, wherein the third query is a size greater than or equal to the size threshold; and
returning a result for the third query stored in a result cache for the database instead of performing the third query at the second query engine.

13. The method of claim 5, wherein performing the second query to the database at the second query engine comprises obtaining data to perform the query at the second query engine from data of the database stored separately from the database.

14. A non-transitory, computer-readable storage medium, storing program instructions that when executed by one or more computing devices cause the one or more computing devices to implement:
receiving a first query to a database at a first query engine;
performing the first query to the database at the first query engine based at least in part on a determination that a size of the first query is less than a size threshold to perform queries to the database at the first query engine, wherein the size of the first query is determined using a size classifier, wherein the size classifier is a machine learning model trained according to a machine learning technique using query plans to make size predictions for database queries, wherein the machine learning model takes as input a first query plan generated by the first query engine and produces as output a probability that the first database query is the size, wherein the size is determined according to an evaluation of the probability output from the machine learning model;
receiving a second query to the database at the first query engine;
determining, at the first query engine that performed the first query to the database, that a size of the second query is greater than or equal to the size threshold to perform queries to the database at the first query engine wherein the size of the second query is determined using the size classifier that takes as input a second query plan generated by the first query engine for the second query; and
after the determination at the first query engine that performed the first query that the size of the second query is greater than or equal to the size threshold to perform queries to the database at the first query engine, send, by the first query engine that performed the first query to the database, the second query along with the second query plan to a second query engine, provisioned for additional capacity to handle increases in workload directed to the database, to cause performance of the second query to the database at a second query engine.

15. The non-transitory, computer-readable storage medium of claim 14, wherein the program instructions cause the one or more computing devices to further implement:
receiving a third query to the database, wherein the third query is a size greater than or equal to the size threshold; and
performing the third query at the first query engine.

16. The non-transitory, computer-readable storage medium of claim 15, wherein the program instructions cause the one or more computing devices to further implement:
identifying an available execution slot at the first query engine, wherein the third query is performed at the available execution slot at the first query engine.

17. The non-transitory, computer-readable storage medium of claim 14, wherein the program instructions cause the one or more computing devices to further implement provisioning the second query engine from a pool of query engines for burst query performance.

18. The non-transitory, computer-readable storage medium of claim 17, wherein the provisioning of the second query engine from the pool of query engines is performed in response to detecting a user scheduled event to provision the second query engine.

19. The non-transitory, computer-readable storage medium of claim 17, wherein the provisioning of the second query engine from the pool of query engines is performed in order to satisfy a user-specified performance criteria for the first query engine.

20. The non-transitory, computer-readable storage medium of claim 14, wherein the first query engine is a primary processing cluster implemented as part of a data warehouse service offered by a provider network that stores the database, wherein the second query engine is a burst processing cluster implemented as part of the provider network, and wherein in causing the performance of the second query at the burst processing cluster, the program instructions cause the one or more computing devices to implement accessing data of the database via another service of the provider network.

* * * * *